United States Patent [19]
Palma

[11] 3,768,658
[45] Oct. 30, 1973

[54] SEPARATOR
[76] Inventor: James R. Palma, 1502 Curry Rd., Schenectady, N.Y. 12306
[22] Filed: Dec. 4, 1972
[21] Appl. No.: 312,041

Related U.S. Application Data
[63] Continuation-in-part of Ser. No. 039,296, May 21, 1970, Pat. No. 3,706,383.

[52] U.S. Cl.................................. 210/304, 210/512
[51] Int. Cl............................................. B01d 21/26
[58] Field of Search..................... 209/211; 210/304, 210/512

[56] References Cited
UNITED STATES PATENTS

| | | | |
|---|---|---|---|
| 3,168,466 | 2/1965 | Milne | 210/512 X |
| 3,346,117 | 10/1967 | Page, Jr. | 210/512 X |
| 2,889,044 | 6/1959 | Cloos | 209/211 |
| 3,616,911 | 11/1971 | Rodrigues | 210/304 X |

*Primary Examiner*—Frank A. Spear, Jr.
*Attorney*—John H. Oltman

[57] ABSTRACT

A fluid separator for separating solids from a liquid or separating a heavier substance from a lighter substance in either liquids or gases by means of centrifugal force in conjunction with the eddy current principle comprising a housing or jacket containing a spirally formed fluid conduit for rotation within said housing adapted to convey fluid therethrough. The coils of the conduit are internally formed with a multiple of spaced abutments on the inside or the outside of the conduit, or both, the abutments extending into the path of the fluid, and openings are provided in the conduit adjacent each of the abutments to permit a selected substance to exit from the conduit due to forces created by the rotating spiral conduit which tends to flow a lighter substance inwardly and a heavier substance outwardly to the wall of the conduit. The abutments in the conduit extending into the path of the fluid set up eddy currents in the spinning liquid to spin adjacent the leading edge of the abutments in one direction and around the trailing edge of the abutments in the reverse direction collecting the lighter or heavier substances disposed in the fluid which are then forced out through the apertures adjacent said abutments. A wall is provided in the jacket to keep lighter and heavier substances separate. Intermediate substances may continue to flow through the conduit.

7 Claims, 5 Drawing Figures

PATENTED OCT 30 1973 3,768,658

SEPARATOR

RELATED APPLICATION

This application is a continuation-in-part of co-pending application Ser. No. 039,296 filed by the present inventor on May 21, 1970, now U.S. Pat. No. 3,706,383.

BACKGROUND OF THE INVENTION

The present invention relates to a filtering apparatus and more in particular to a centrifugal fluid separator having a rotatable spirally formed conduit supported within a jacket or housing.

Centrifugal fluid filters or fluid separators are known which include means to spin the fluid within the conduit or within the filter chamber along a spiral path to thereby force contaminants or other heavier substances outwardly to the wall of the fluid conduit or filter chamber for collection thereon and subsequent disposal to a dust collector bin or receptacle.

However, serious difficulties have been encountered in the operation of these known centrifugal fluid separators because of the difficulty of effective disposal of the contaminants or heavier substances after being separated from the fluid to prevent their re-entrainment by the fluid.

Another difficulty encountered in known fluid separators of the centrifugal type is the heat exchange effect caused by the spinning fluid which, at times, causes undesirable heating of the fluid to be filtered.

Also, it has not been proposed to separate both lighter and heavier substances from an intermediate substance.

SUMMARY OF THE INVENTION

The present invention provides an improved fluid separator of the centrifugal type which, in addition to the fluid separation caused by centrifugal force, utilizes artificially created eddy currents to separate solids from the moving fluid.

The improvement of the present invention consists of a spiral fluid conduit which is continuously rotated to create centrifugal forces within the spiral portion of the conduit to thereby move solids or other contaminants heavier than the fluid outwardly against the wall of the conduit. Lighter substances tend to stay against the opposite wall of the conduit.

The spiral rotatable portion of the fluid conduit is provided internally with a plurality of equally spaced abutments along its entire length which extend into the path of the moving and spinning fluid. These abutments may be located on the inside of the conduit or the outside of the conduit or both places. The moving fluid causes eddy currents to be created around the plurality of abutments which at the leading edge of the abutments swirl in one direction and at the trailing edge in the reverse direction. Immediately adjacent the abutments openings or orifices are provided in the conduit extending outwardly, and contaminants or other substances are forced out through these orifices by means of the eddy current principle created by the internal abutments in combination with the centrifugal force created by the revolving spiral conduit. The centrifugal force set up by the relatively fast spinning spiral conduit also prevents intermediate fluid from passing through the orifices provided adjacent the internal abutments. A wall may be provided in the housing to keep heavier and lighter substances apart.

The technical advantages and novel features of the present invention will become more readily apparent by reference to the following detailed description in conjunction with the appended drawings forming a part thereof.

BRIEF DESCRIPTION OF THE DRAWINGS

The concept of the present invention is schematically illustrated by various examples in the accompanying drawings in which.

DESCRIPTION OF THE PREFERRED EMBODIMENTS

Figure 1:
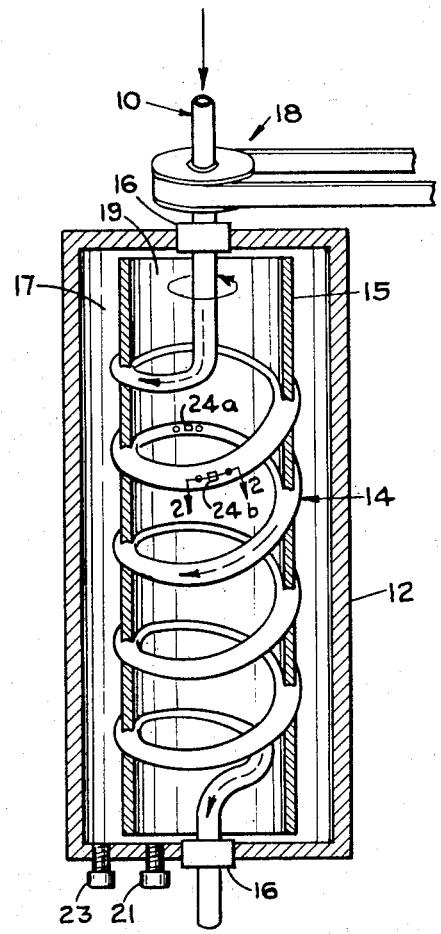
FIG. 1 is a schematic side view of the present novel coiled fluid separator.

With reference to FIG. 1, there is illustrated a fluid conduit generally indicated at 10, a portion of which is contained within a jacket or a housing 12. The portion 14 of the conduit 10 contained within the jacket 12 is coiled in spiral form and the conduit 10 is suitably rotatably supported in bushings 16 at both ends of the jacket 12. The spiral portion 14 of the fluid conduit 10 is continuously rotated within the jacket 12 by any conventional drive means 18. The coiled portion 14 of the conduit is partially embedded in a cylindrical wall 15.

The fluid conduit 10 is adapted to convey a fluid which, as shown in the illustration in FIG. 1, flows from the top of the figure towards the bottom along the coils of the coiled portion 14 of the conduit 10 which are slanted in the direction of fluid flow, as illustrated.

The coiled portion 14 of the conduit 10, in conjunction with the jacket 12 comprises a separator adapted to separate substances according to specific gravity.

Figure 2:
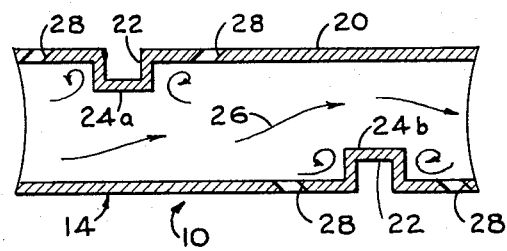
FIG. 2 is a longitudinal cross-section along the coiled portion of the fluid separator conduit.

With reference to FIG. 2, which shows a longitudinal cross-section of the coiled portion 14 of the conduit 10, it is seen that the coiled portion 14 of the conduit 10 is composed of a tube having a circumferential wall 20. At spaced intervals, the wall 20 of the tubular conduit is provided with indentations 22 forming internal protrusions 24 which project into the path of the fluid 26 moving through the tubular conduit. Adjacent the protrusions 24, orifices 28 are provided in the tubular wall 20 which are disposed at an angle relative to the wall surface in the direction of fluid movement. Note that protrusion 24a is located at the inside of the coil 14 toward its axis and protrusion 24b is located at the outside of coil 14.

The entire coiled portion 14 of the conduit 10 is constructed in a manner as shown in FIG. 2, providing a plurality of internal protrusions along the coils from end to end which are oppositely positioned as shown and spaced in staggered relationship along the internal wall surface of the tubular conduit.

As mentioned above, adjacent the internal and external protrusions 24a and 24b, orifices 28 are provided extending to the outside of the conduit which are angularly positioned relative to the longitudinal axis of the conduit in the direction of fluid flow. The apertures or orifices 28 are adapted to eject substances lighter and heavier than the intermediate fluid from the flow of fluid passing through the conduit for disposal into the jacket or housing 12. The orifices adjacent protrusions 24a communicate with space 17 outside wall 15, and the orifices adjacent protrusions 24b communicate with space 19 inside wall 15.

In operation, the fluid is passed through the conduit 10 from the top in FIG. 1 and moved along the coiled portion 14 of the conduit within the housing or jacket 12 towards the bottom in FIG. 1. The coiled portion 14 of the conduit 10 in the housing or jacket 12 is continuously rotated during flow of fluid through the conduit by the drive means 18 causing spinning of the fluid in the coiled portion 14 of the conduit. The ends of the spiral tube may be axially centered.

The fluid flow in the coiled portion 14 of the conduit is obstructed by the protrusions 24 extending into the path of fluid flow causing swirls or eddy currents to be set up around the leading and trailing edges of the protrusions 24. At the leading edge of the protrusions 24 the fluid is swirled in the direction opposite to the direction of fluid flow and at the trailing edge of the protrusions the swirling fluid rotates in the opposite direction. Contaminants or other substances heavier than the intermediate fluid passing through the conduit are continuously moved outwardly against the wall of the conduit and moved therealong in the direction of fluid flow upon approachment of the protrusions 24 the contaminants or other heavier substances are forced out through the apertures or orifices 28 by means of the swirling fluid around the leading and trailing edges of the protrusions 24b. Similarly, substances lighter than the intermediate fluid are forced out through the orifices 28 at protrusions 24a by means of the swirling fluid around the leading and trailing edges of the protrusions 24a. Thus, the present device to separate contaminants from the fluid utilizes centrifugal forces in conjunction with artificially created eddy currents to separate the contaminants from the fluid and to continuously eject the contaminants from the fluid conduit. The lighter substance can be drawn off through outlet 21 and the heavier substance can be drawn off through outlet 23.

Although the internal protrusions 24a and 24b in FIG. 2 are shown to have been created by indenting the tubular wall 20 of the conduit, it will be understood that the protrusions could be created or constructed in any other manner such, as for instance, being integrally formed along the inner surface of the tubular wall 20 of the conduit.

The protrusions 24a and 24b of FIG. 2 are shown to be of substantially square cross-section in longitudinal direction of the tubular wall 20 extending inwardly along an axis normal to the longitudinal axis of the conduit. The protrusion may occupy only about one-eighth of the circumference of the conduit.

Figure 3:
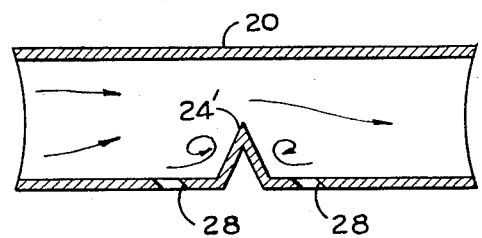
FIG. 3 is another longitudinal cross-section through the conduit illustrating another embodiment.
Figure 5:
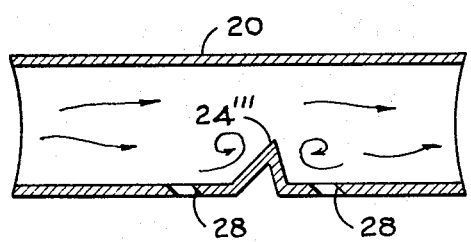
FIG. 5 illustrates still another embodiment of the present invention.

The shape and direction of extension of the protrusions, however, can be varied in accordance with the required degree of separation depending on the kind of fluid and type of contaminants to be separated therefrom. FIGS. 3 and 5 illustrate, by example, several modifications in the shape of the internal protrusions which can be utilized in the present invention.

In FIG. 3, the protrusions 24' are shown to be of cone shaped cross-section having an apex extending in a direction normal to the direction of fluid flow. This construction of protrusions within the path of fluid flow causes less violent swirling or eddy currents of the fluid around the leading and trailing edges of the protrusions.

Figure 4:
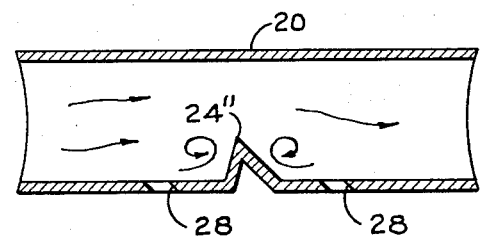
FIG. 4 illustrates a further embodiment of the present invention.

In FIG. 4, the protrusions 24'' extending into the path of the fluid flow are likewise of cone shaped cross-section but having its axis or apex inclined in the direction of fluid flow causing the creation of an even smoother eddy current around the leading edge of the protrusions and substantially less swirl or eddy current at the trailing edge of the protrusions 24''.

In FIG. 5, the protrusions 24''' are also shown to be of cone shaped cross-section which, in this instance however, have their axis or apex inclined in the direction opposite from that shown in FIG. 4, that is, in the direction opposite to the fluid flow. By this structure, a more violent eddy current will be set up at the leading edge of the protrusions whereas a substantially smooth eddy current is formed at the trailing edge of the protrusions.

In all of these various modifications, apertures or orifices 28 are provided adjacent the leading and trailing edges of the protrusions which are angled outwardly in the direction of fluid flow to eject the separated contaminants from the fluid as the fluid approaches the protrusions.

As mentioned before, the desired shape of the protrusions is dependent primarily on the type of fluid flowing through the conduit 10; the kind of contaminants to be separated therefrom and the rate of fluid flow through the conduit 10 so that the most effective shape of the protrusions may be chosen for any particular fluid separation requirement.

It will be evident from the foregoing description and the accompanying drawings that the present invention provides an effective means to separate contaminants from a moving and spinning fluid by utilizing the centrifugal separation principle in conjunction with eddy currents set up in the fluid which are created by obstructions extending into the path of the moving fluid and ejecting the contaminants from the fluid through orifices provided adjacent the obstructions.

The present invention has been described and disclosed in connection with several preferred embodiments thereof which, however, are not considered to be construed as a limitation, but rather as various examples of modifications of the invention well within the scope as defined in the appended claims.

I claim:

1. In an eddy current principle fluid separator adapted to separate contaminants from a moving fluid, the improvement comprising: a housing, a coiled fluid conduit extending through said housing, means provided in said conduit comprising a plurality of spaced abutments extending from the internal surface of said conduit internally thereof into the path of said moving fluid on the inside and outside of said coiled conduit relative to the axis thereof causing the creation of eddy currents adjacent to the edges of said abutments, opening means in said conduit including inside openings and outside openings respectively adjacent to said abutments to eject contaminants from said fluid outwardly of said conduit by means of the eddy current effect around said abutments, and hollow wall means in said housing partially embedding said conduit but leaving said inside openings communicating with the inside of said wall means and said outside openings communicating with the outside of said wall means for separating lighter and heavier substances.

2. In a fluid separator as defined in claim 1, the portion of said fluid conduit extending through said housing being shaped in a spiral form providing a plurality of coils and means drivingly connected to said conduit to continuously rotate the coiled portion of said conduit within said housing.

3. In a fluid separator as defined in claim 1, said openings extending angularly outwardly from said conduit in the direction of fluid flow.

4. In a fluid separator as defined in claim 1, said abutments having a substantially rectangular cross-section.

5. In a fluid separator as defined in claim 1, said abutments having a substantially cone shaped cross-section and having an apex extending in a direction normal to the direction of fluid flow in said conduit.

6. In a fluid separator as defined in claim 5, said cone shaped abutments having an apex inclined in the direction of fluid flow within said conduit.

7. In a fluid separator as defined in claim 5, said cone shaped abutments having an apex extending in a direction opposite to the direction of fluid flow within said conduit.

* * * * *